US011000807B2

(12) United States Patent
Beall

(10) Patent No.: US 11,000,807 B2
(45) Date of Patent: May 11, 2021

(54) REVERSE OSMOSIS SYSTEM CONTROL VALVES

(71) Applicant: Topper Manufacturing Corporation, Torrance, CA (US)

(72) Inventor: Timothy Allen Beall, Redondo Beach, CA (US)

(73) Assignee: Topper Manufacturing Corporation, Torrance, CA (US)

( * ) Notice: Subject to any disclaimer, the term of this patent is extended or adjusted under 35 U.S.C. 154(b) by 53 days.

(21) Appl. No.: 15/624,534

(22) Filed: Jun. 15, 2017

(65) Prior Publication Data

US 2017/0361275 A1 Dec. 21, 2017

Related U.S. Application Data

(60) Provisional application No. 62/351,188, filed on Jun. 16, 2016, provisional application No. 62/351,494, filed on Jun. 17, 2016.

(51) Int. Cl.
*B01D 61/02* (2006.01)
*B01D 61/08* (2006.01)
*B01D 61/12* (2006.01)
*C02F 1/44* (2006.01)
*B01D 61/20* (2006.01)
(Continued)

(52) U.S. Cl.
CPC ........... *B01D 61/12* (2013.01); *B01D 61/025* (2013.01); *B01D 61/20* (2013.01); *C02F 1/008* (2013.01); *F16K 11/0716* (2013.01); *B01D 61/08* (2013.01); *B01D 2311/14* (2013.01); *B01D 2313/04* (2013.01); *B01D 2313/18* (2013.01);
(Continued)

(58) Field of Classification Search
CPC ..... B01D 61/12; B01D 2313/18; C02F 1/008; C02F 2201/004; C02F 2201/005
See application file for complete search history.

(56) References Cited

U.S. PATENT DOCUMENTS 4,604,194 A 8/1986 Entingh
4,705,625 A 11/1987 Hart, Jr.
(Continued)

OTHER PUBLICATIONS

DuPont, "DuPont Delrin AF Blend Technical Data Sheet," 2020 (Year: 2020).*
(Continued)

*Primary Examiner* — Bradley R Spies
(74) *Attorney, Agent, or Firm* — Womble Bond Dickinson (US) LLP

(57) ABSTRACT

A control valve for a reverse osmosis water purifying system provides a feed water port, a squeeze water port, a drain port, and a product water connection, each of which open into a bore. A first, second, and third O-rings are located in the bore successively between the feed water port, the squeeze water port, the drain port, and the product water connection. A control piston is moveably located in the bore of the housing. The control piston includes a vent/drain well in which a side is chamfered. The vent/drain well provides a fluid passage between the squeeze water port and the drain port when the vent/drain well passes over the second O-ring. The fluid passage includes an opening formed between the second O-ring and the chamfered side of the vent/drain well, where the size of the opening is responsive to the position of the control piston.

20 Claims, 3 Drawing Sheets

(51) Int. Cl.
*C02F 1/00* (2006.01)
*F16K 11/07* (2006.01)

(52) U.S. Cl.
CPC ........ *C02F 1/441* (2013.01); *C02F 2201/004* (2013.01); *C02F 2201/005* (2013.01)

(56) References Cited

U.S. PATENT DOCUMENTS

| | | |
|---|---|---|
| 6,110,360 A | 8/2000 | Hart, Jr. |
| 7,601,256 B2 | 10/2009 | Beall |
| 8,257,594 B2 | 9/2012 | Astle et al. |
| 2006/0151033 A1* | 7/2006 | Rojanskiy ............ B01D 61/06 137/625.67 |
| 2007/0045165 A1 | 3/2007 | Beall |
| 2009/0060753 A1* | 3/2009 | Jones ............... F04B 43/04 417/46 |
| 2009/0200238 A1 | 8/2009 | Astle et al. |
| 2010/0024893 A1 | 2/2010 | Beall |
| 2010/0116724 A1* | 5/2010 | Schmitt ............... B01D 61/08 210/136 |
| 2010/0243942 A1* | 9/2010 | Burrows ............... B01D 61/10 251/321 |
| 2011/0132960 A1 | 6/2011 | Whitman et al. |
| 2014/0102985 A1 | 4/2014 | Bassett et al. |
| 2015/0083666 A1 | 3/2015 | Bassett et al. |
| 2016/0109029 A1* | 4/2016 | Dulin ............... F16K 3/0254 137/468 |

OTHER PUBLICATIONS

"International Search Report and Written Opinion of the International Searching Authority dated Oct. 27, 2017; International Application No. PCT/US2017/037938", Oct. 27, 2017.

"Invitation to Pay Additional Fees dated Aug. 28, 2017; International Application No. PCT/US2017/037938", Aug. 28, 2017.

* cited by examiner

REVERSE OSMOSIS SYSTEM CONTROL VALVES

CROSS REFERENCE TO RELATED APPLICATIONS

This application claims the benefit pursuant to 35 U.S.C. 119(e) of U.S. Provisional Application No. 62/351,188, filed Jun. 16, 2016, and U.S. Provisional Application No. 62/351,494, filed Jun. 17, 2016, each of which is hereby incorporated by reference in its entirety.

BACKGROUND

Field

The present invention relates to the field of reverse osmosis water filters; and more specifically, to control valves for reverse osmosis water filters.

Background

The present invention represents improvements in the reverse osmosis control valve disclosed in U.S. Pat. No. 6,110,360. That valve was a considerable advance in the art at the time of its development. However it still had some problems, which problems have been accentuated as reverse osmosis filter system performance in terms of rate of production of product water has greatly increased over the years, as more fully described below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

Figure 1:
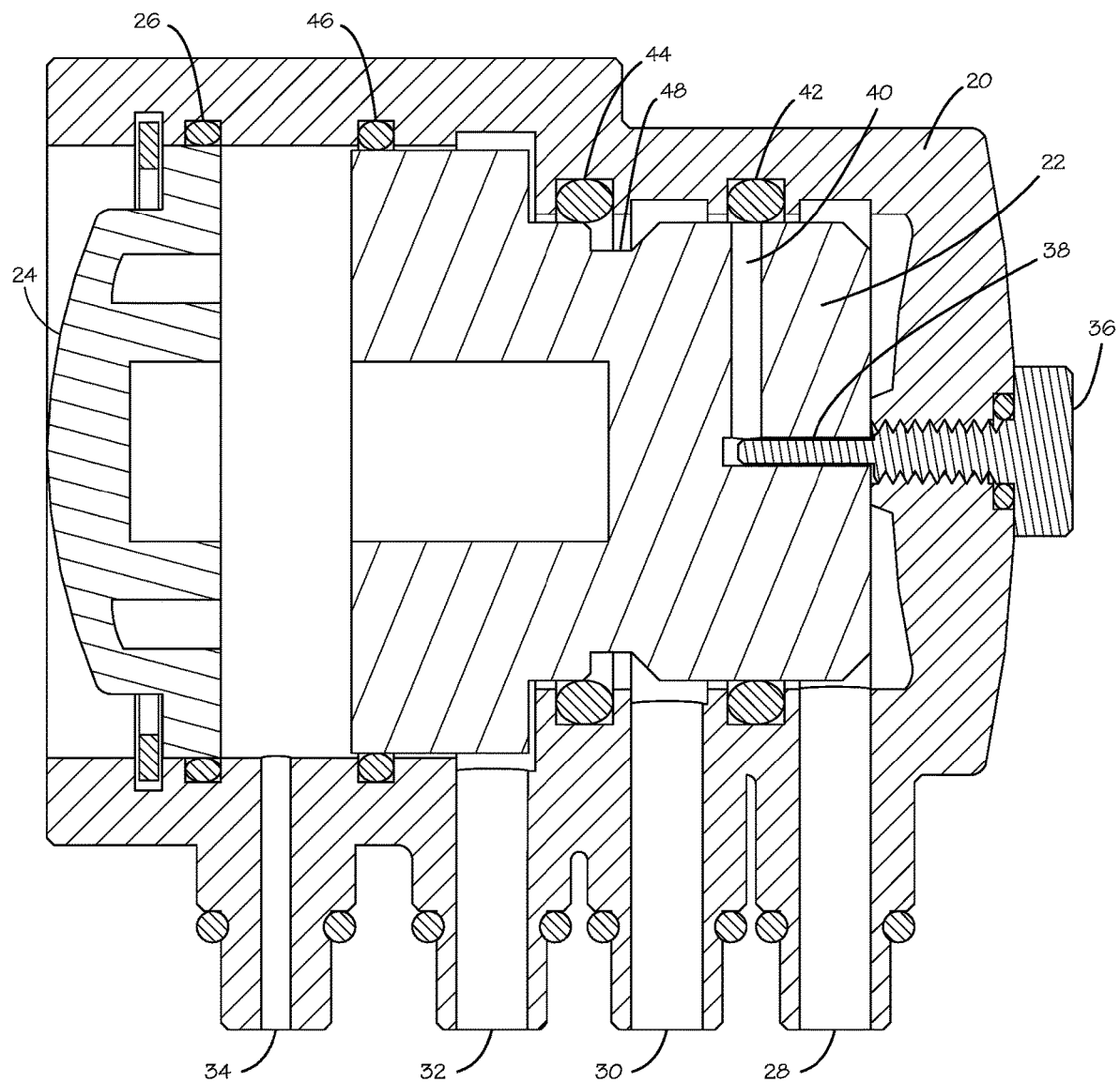
FIG. 1 illustrates a control valve in accordance with the present invention in a system shutoff position.

In the following description, numerous specific details are set forth. However, it is understood that embodiments of the invention may be practiced without these specific details. In other instances, well-known circuits, structures and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Control valves in accordance with U.S. Pat. No. 6,110,360 were first introduced in Florida, typically a warm water market. The valve used a Teflon piston as stated in the patent, selected to avoid wear on the O-rings from piston motion, and proved to be a success as long as there was never a severe shift in water temperatures. However, when cutting the Teflon material at one temperature to fabricate the piston, then operating the control valve at a lower temperature, the piston will shrink beyond operational dimensions, with the result that the water system will drain on its own. While Teflon has the desired lubricity, it is too unstable a material to properly function over a substantial temperature range, as can be expected in probably most regions of the U.S. and many other countries. To overcome this problem, the present invention utilizes a much more stable family of plastics for the material of the control valve piston, namely, acetal types of plastic, such as by way of example, Delrin as manufactured by DuPont and Celcon as manufactured by Celanese. The acetal plastics are much more stable than Teflon and maintain the required dimensional tolerances over the required temperature range to provide highly satisfactory operation over any reasonable temperature range.

Also, the control valve of U.S. Pat. No. 6,110,360 was developed at a time when the daily output of a typical reverse osmosis membrane was on the order of 15 gallons per day. In that regard, it is important to note that in the design of the control valve of U.S. Pat. No. 6,110,360, all of the functional operations are related to timing—when to vent, when to turn off, when to turn on, etc. In that regard, the control valve is intended to operate in conjunction with reverse osmosis filter systems having a bladder in the product water storage tank, whereby product water may be added to the internal volume of the bladder while the outer surface of the bladder is vented to atmospheric pressure during product water generation, and to provide squeeze water, that is reverse osmosis filter membrane waste water at tap water pressure, to the outer surface of the bladder to pressurize the product water during product water dispensing.

Figure 2:
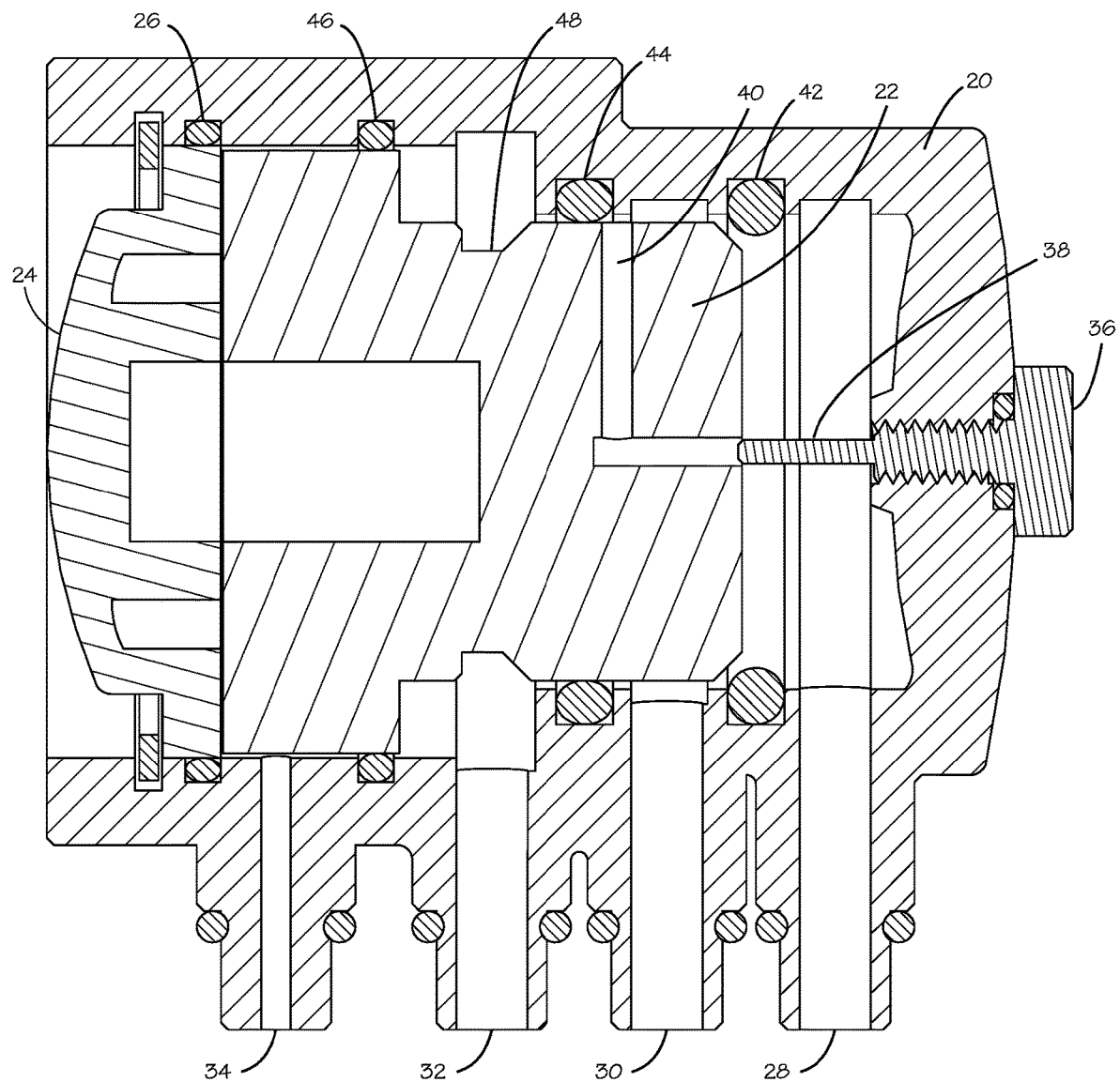
FIG. 2 illustrates the control valve of FIG. 1 in a product water dispensing position.
Figure 3:
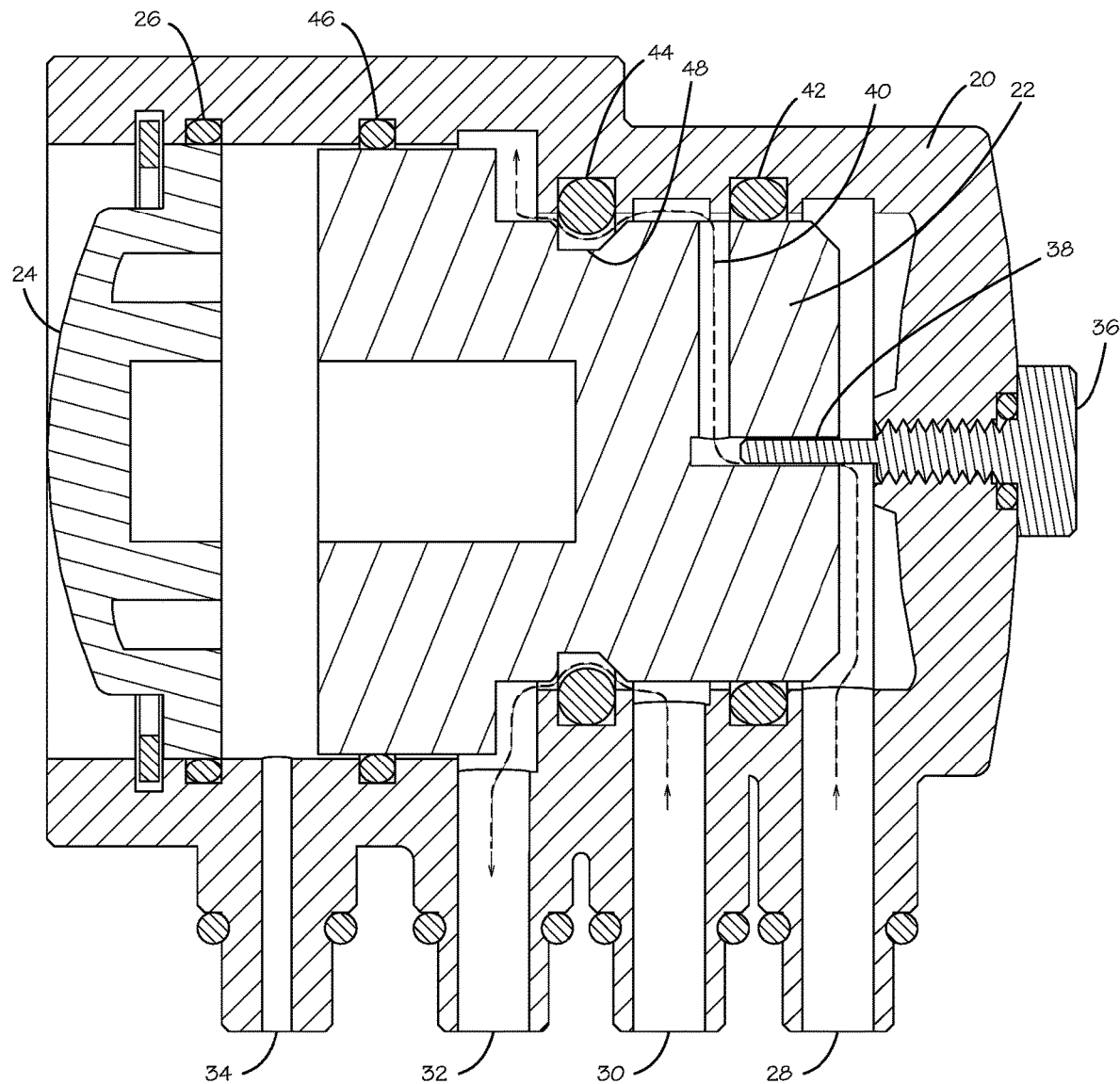
FIG. 3 illustrates the control valve of FIG. 1 in a product water production position.

FIGS. 1, 2 and 3 illustrate a control valve in accordance with the present invention wherein the major components of the control valve may be seen. The control valve includes a housing 20 with a control piston 22 therein, sealed at the left end by cap 24 and O-ring 26. The housing 20 includes four ports, namely a feed water port 28 (reverse osmosis filter membrane waste water at tap water pressure), a squeeze water port 30 and a drain port 32, together with product water connection 34. In these Figures, the cross section shown is a form of composite cross sections to place the ports 28, 30, and 32 and product water connection 34 in the same plane, which has distorted the control piston 22, though except for the flow path 40, the control piston 22 has a surface of revolution.

At the right end of housing 20 is a feed water metering screw 36 which has an extension 38 extending into an axial opening in the control piston 22, which together with flow path 40, allows a slow but positive rate of feed water through feed water port 28 when not blocked by O-rings between the housing 20 and the control piston 22, namely, O-ring 42.

In this embodiment, the reverse osmosis filter membrane is always exposed to the full feed water pressure in feed water port 28 and the left end, the larger end of control piston 22, is always exposed to a product water pressure through product water connection 34, which as shall be subsequently described, is isolated from reverse flow back to the product water storage tank by a check valve there between. Accordingly, as may be seen in FIG. 1, when the product water storage tank is full of product water, the product water pressure in the storage tank will increase by continued, though slower, production of product water to increase the pressure in the product water connection 34, ultimately forcing the control piston 22 to the far right position, as shown in FIG. 1, because of the difference in the areas of the two ends of the control piston 22. In this far right position, O-ring 42 blocks any feed water flow past the O-ring, stopping all water flow in the system. In that regard, as mentioned before, the reverse osmosis membrane in this embodiment is coupled to the raw water source (tap water) at all times, with feed water port 28 being coupled to the waste water outlet of the reverse osmosis filter unit. Accordingly, shutting off the flow through feed water port 28 shuts off all water flow through the system.

When a product water dispensing valve is opened to dispense the reverse osmosis filtered water, the product water pressure in product water connection 34 will immediately drop, allowing the feed water pressure in feed water port 28 to force the control piston 22 to the far left position, as shown in FIG. 2, moving the control piston past O-ring 42, but not past O-ring 44, so that now the feed water port 28 is coupled to the squeeze water port 30 to pressurize the outer surface of the bladder in the product water storage tank, which in turn forces product water within the bladder through the dispenser.

When the dispensing stops, the squeeze water port 30 is still coupled to the feed water port 28 so that the product water coupled to product water connection 34 is still at the squeeze water pressure, which is equal to the feed water pressure. Accordingly, control piston 22 will start to move to the right until the squeeze water port 30 is coupled to the drain port 32, as may be seen in FIG. 3. In this position, O-ring 42 blocks flow from feed water port 28 around the right end of control piston 22. Also, with the control piston 22 in the position shown in FIG. 3, the restricted feed water flow in flow path 40 is also coupled to the drain port 32 through vent/drain well 48 in the control piston 22. This causes the squeeze water pressure on squeeze water port 30 and on the outside of the product water storage tank to fall to atmospheric pressure. However, the check valve previously mentioned prevents product water from flowing back out of product water connection 34, and of course because the dispensing valve is now closed, product water cannot flow out of the product water connection 34 through the dispensing valve, so the control piston 22 will stop at the position shown in FIG. 3. Under this condition, the pressure on the outside of the bladder in the product water storage tank is essentially atmospheric, and the feed water flow past the reverse osmosis membrane and through feed water port 28 is restricted. During this time, product water is being produced, thereby filling the storage tank with product water, after which product water pressure will increase as previously described, moving the control piston 22 to the far right position shown in FIG. 1, shutting the system off.

However in the prior art systems, the low speed of movement of the control piston proved to be of vital importance for proper operation of the control valve. The vent/drain well of the piston in the prior art systems was cut at 90 degree angles. This has been found to cause at least two problems in the best present-day systems.

The first problem is that the width of the channel of the vent/drain well 48 from one wall to the other wall represents the time between squeeze venting and system shut down. Using the latest reverse osmosis membrane technology for current high product water production rates of 60 to 100 gallons per day achievable in the newest reverse osmosis filtering systems, such as those of U.S. Pat. No. 7,601,256, the faster water causes the control piston 22 to move from the full squeeze position (dispensing) (FIG. 2) through squeeze water exhaust position (FIG. 3) to shutdown (FIG. 1) and never make water. This would only occur during the initial startup phase of the reverse osmosis filter system. Still, the system would not work right out of the box.

This problem is solved in the present invention by chamfering at least one side of the vent/drain well 48 in the control piston 22 as shown in the FIGS. For the purposes of this specification, "chamfering" the side of the vent/drain well 48 means providing an angled wall on the vent/drain well as shown in the FIGS. The "chamfering" extends into the vent/drain well 48 sufficiently further than the O-ring 44 such that the "chamfering" provides a path past the O-ring 44 that opens slowly as the control piston 22 moves to the right. The "chamfering" may extend to the full depth of the vent/drain well 48 as shown in the FIGS. so that the "chamfering" connects the outer cylindrical surface of the control piston 22 to the parallel cylindrical surface at the bottom of the vent/drain well.

The chamfering of the side of the vent/drain well 48 achieves two things. First it starts venting the squeeze water past O-ring 44 early and slowly. This allows the system to stabilize and avoids or minimizes any momentary maintenance of product water pressure after venting of squeeze water occurs, slowing the movement of control piston 22 to the right and allowing it to stop when the squeeze water is vented past O-ring 44, stopping the flow of product water to the left side of the control piston 22, but holding its volume of water by the check valve previously described. Then when the system fills to product water storage tank bladder capacity, the product water pressure increases to supply more product water through product water connection 34, whereby the control piston 22 now continues the movement toward the right to finish the cycle to the full shut down as shown in FIG. 1.

Finally, the chamfering of the vent/drain well 48 also prevents the otherwise square corner of the vent/drain well 48 from catching the O-ring 44, and provides a self-centering action to avoid that problem.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A control valve for a reverse osmosis water purifying system, the control valve comprising:
   a housing having a feed water port, a squeeze water port, a drain port, and a product water connection, each of which open into a bore;
   a first O-ring located in the bore between the feed water port and the squeeze water port;
   a second O-ring located in the bore between the squeeze water port and the drain port;
   a third O-ring located in the bore between the drain port and the product water connection; and
   a control piston moveably located in the bore of the housing, the control piston including a vent/drain well in which a side is chamfered, the vent/drain well providing a fluid passage between the squeeze water port and the drain port when the vent/drain well passes over the second O-ring, the fluid passage including an opening formed between the second O-ring and the chamfered side of the vent/drain well;
   the chamfered side of the vent/drain well extending to a full depth of the vent/drain well to provide a flow path past the second O-ring that opens as the control piston moves toward the feed water port from a position furthest from the feed water port;
   the control piston being stopped when squeeze water is vented past the second O-ring;
   when the flow path is opened, a restricted feed water flow in the flow path being coupled to the drain port through the vent/drain well in the control piston.

2. The control valve of claim 1, wherein the chamfered side of the vent/drain well extends from an outer cylindrical surface of the control piston to a parallel cylindrical surface at a bottom of the vent/drain well.

3. The control valve of claim 1, wherein the control piston includes a first flow path that provides a slow but positive rate of feed water flow from the feed water port to the squeeze water port when the first flow path is not blocked by the first O-ring.

4. The control valve of claim 3, wherein the control piston further cooperates with the third O-ring to block flow between the drain port and the product water connection when the control piston is at a position closest to the feed water port.

5. The control valve of claim 1, wherein the control piston moves past the first O-ring to directly couple the feed water port to the squeeze water port when the control piston is at the position furthest from the feed water port.

6. The control valve of claim 5, wherein the control piston further cooperates with the second O-ring to block flow between the squeeze water port and the drain port when the control piston is at the position furthest from the feed water port.

7. The control valve of claim 1, wherein the control piston further cooperates with the third O-ring to block flow between the product water connection and the drain port in all positions of the control piston.

8. A method for controlling a reverse osmosis water purifying system, the method comprising:
   coupling reverse osmosis filter membrane waste water at tap water pressure to a feed water port of a control valve;
   coupling a product water storage tank to a product water connection of the control valve through a check valve that prevents reverse flow from the product water connection back to the product water storage tank;
   coupling a product water dispensing valve to the product water connection of the control valve such that the check valve prevents reverse flow from the product water dispensing valve back to the product water storage tank;
   opening the product water dispensing valve to move a control piston in the control valve to a position furthest from the feed water port and thereby coupling the feed water port to a squeeze water port of the control valve to pressurize an outer surface of a bladder in the product water storage tank; and
   closing the product water dispensing valve to move the control piston toward the feed water port and thereby coupling the squeeze water port and a drain port of the control valve and reduce the pressure on the outer surface of the bladder, wherein the control piston includes a vent/drain well in which a side is chamfered, the vent/drain well providing a fluid passage between the squeeze water port and the drain port when the vent/drain well passes over an O-ring, the fluid passage including an opening formed between the O-ring and the chamfered side of the vent/drain well, the chamfered side of the vent/drain well extending to a full depth of the vent/drain well to provide a flow path past the O-ring that opens as the control piston moves toward the feed water port from the position furthest from the feed water port, the control piston being stopped when squeeze water is vented past the O-ring, and when the flow path is opened, a restricted feed water flow in the flow path being coupled to the drain port through the vent/drain well in the control piston.

9. The method of claim 8, wherein the chamfered side of the vent/drain well extends from an outer cylindrical surface of the control piston to a parallel cylindrical surface at a bottom of the vent/drain well.

10. The method of claim 8, further comprising providing a slow but positive rate of feed water flow from the feed water port to the squeeze water port when the vent/drain well is over the O-ring.

11. The method of claim 10, further comprising blocking flow between the drain port and the product water connection when the control piston is at a position closest to the feed water port.

12. The method of claim 8, further comprising coupling the feed water port directly to the squeeze water port when the control piston is at the position furthest from the feed water port.

13. The method of claim 12, further comprising blocking flow between the squeeze water port and the drain port when the control piston is at the position furthest from the feed water port.

14. The method of claim 8, further comprising blocking flow between the product water connection and the drain port in all positions of the control piston.

15. A control valve for a reverse osmosis water purifying system, the control valve comprising:
   a housing having a feed water port, a squeeze water port, a drain port, and a product water connection, each of which open into a bore;
   a first O-ring located in the bore between the feed water port and the squeeze water port;
   a second O-ring located in the bore between the squeeze water port and the drain port;
   a third O-ring located in the bore between the drain port and the product water connection;
   a control piston moveably located in the bore of the housing, the control piston providing a fluid passage between the squeeze water port and the drain port as the control piston moves from a first position furthest from the feed water port to a second position closest to the feed water port; and
   a vent/drain well in the control piston to control a rate of venting of squeeze water from the squeeze water port to the drain port responsive to a position of the control piston, the vent/drain well having a chamfered side that cooperates with the second O-ring to provide an opening in the fluid passage from the squeeze water port to the drain port, a size of the opening being responsive to the position of the control piston;
   the chamfered side of the vent/drain well extending to a full depth of the vent/drain well to provide a flow path past the second O-ring that opens as the control piston moves from the first position furthest from the feed water port to the second position closest to the feed water port;
   the control piston being stopped when squeeze water is vented past the second O-ring;
   when the flow path is opened, a restricted feed water flow in the flow path being coupled to the drain port through the vent/drain well in the control piston.

16. The control valve of claim 15, wherein the control piston is of acetal plastic material.

17. The control valve of claim 16, wherein the chamfered side of the vent/drain well extends from an outer cylindrical surface of the control piston to a parallel cylindrical surface at a bottom of the vent/drain well.

18. The control valve of claim 15, further comprising means for providing a slow but positive rate of feed water flow from the feed water port to the squeeze water port when the control piston is at a position near but not closest to the feed water port.

19. The control valve of claim 15, further comprising means for blocking flow between the squeeze water port and the drain port when the control piston is at the position furthest from the feed water port.

20. The control valve of claim 15, further comprising means for blocking flow between the product water connection and the drain port in all positions of the control piston.

\* \* \* \* \*